United States Patent [19]
Montagne

[11] 3,799,230
[45] Mar. 26, 1974

[54] HIGH-SPEED RADIAL TIRE
[75] Inventor: Jean Bernard Montagne, Cebazat, France
[73] Assignee: Compagnie Generale Des Etablissments Michelin raison sociale Michelin & Cie, Clermont-Ferrand (Pug-de-Dame), France
[22] Filed: July 7, 1972
[21] Appl. No.: 269,800

[30] Foreign Application Priority Data
July 8, 1971 France................................ 7125142

[52] U.S. Cl.............................................. 152/209 R
[51] Int. Cl. ............................................. B60c 11/06
[58] Field of Search..................... 152/209 R, 209 D

[56] References Cited
UNITED STATES PATENTS
3,411,559  11/1968  Verdier............................... 152/209
3,637,001  1/1972   Roberts et al. ..................... 152/209

Primary Examiner—James B. Marbert
Attorney, Agent, or Firm—Brumbaugh, Graves, Donohue & Raymond

[57] ABSTRACT

The crown of a radial tire designed for high speeds has two lateral portions and a center portion, the lateral portions being narrower and more rigid than the center portion. The tire tread comprises, starting at the edges and proceeding towards the center: (a) two circumferential lateral ridges cut over their entire width by transverse grooves, (b) two circumferential lateral grooves substantially centered on the median lines of the comparatively rigid lateral portions of the crown, (c) two circumferential intermediate ridges substantially centered on the lines of junction of the comparatively rigid lateral portions and the less rigid center portion of the crown, (d) two circumferential center grooves, and (e) one circumferential center ridge at least as wide as the intermediate ridges.

6 Claims, 2 Drawing Figures

PATENTED MAR 26 1974

3,799,230

HIGH-SPEED RADIAL TIRE

BACKGROUND OF THE INVENTION

This invention relates to radial tires and, more particularly, to radial tires having a novel and highly-effective tread by which they are adapted to high-speed travel.

Radial tires specially designed for high-speed travel are disclosed in French Pat. Nos. 1,427,886 and 1,437,415. In such tires, the crown, i.e., the tread and its reinforcement, comprises three zones of different rigidity: two comparatively narrow and rigid lateral zones, and one comparatively wide and less reinforced center zone. Experience has shown that conventional treads are not quite suitable for use with advanced tire architecture of the type disclosed in the patents. Specifically, the wear and tear on the tread is not uniform.

SUMMARY OF THE INVENTION

An important object of the present invention is to remedy the problems of conventional radial tires outlined above and, in particular, to provide a type of tread adapted to the advanced radial-tire architecture mentioned above and which, specifically, shows uniform wear over the entire width of the tread. Another object of the invention is to provide a tire having a tread designed for effective draining of the entire area of contact of tire and road during travel at high speed in wet weather.

It has been found that the area of contact of the tire with the road does not have the almost elliptical shape usually found. Rather, the contour of the area of contact is sinuous towards the front and the back, and the maximum dimension in the longitudinal direction is not always located along the longitudinal axis of symmetry of the area of contact but most frequently along the two lines which correspond closely to the centers of the narrow and rigid lateral zones of the crest. Moreover, the ground pressure is maximum along these lines of the contact area and lower in the vicinity of the longitudinal axis of symmetry.

The design of the tire in accordance with the invention takes these observations into account. The tire comprises a radial carcass and a crown reinforcement extending substantially over the entire width of the tread. The crown reinforcement has two narrower lateral portions that are comparatively more rigid than the intermediate or center zone. So much of the structure is conventional. The tire is characterized in that the tread comprises in succession, starting at the edges and proceeding towards the center: (a) two circumferential lateral ridges cut over their entire width by transverse grooves, (b) two circumferential lateral grooves substantially centered on the median lines of the comparatively rigid lateral portions of the crown, (c) two circumferential intermediate ridges substantially centered on the lines of junction of the comparatively rigid lateral portions and the less rigid center portion of the crown, (d) two circumferential center grooves, and (e) one center circumferential center ridge at least as wide as the intermediate ridges.

In accordance with preferred additional provisions:

a. The center ridge is divided into two or three bands of equal width by one or two thin circumferential cutouts, i.e., grooves of minor width.

b. The circumferential center grooves are at least as wide as the circumferential lateral grooves; it is desirable that their widths be in the same proportion as the widths of the center ridge and the intermediate ridges.

c. The various circumferential cutouts and grooves have a zigzag pattern the successive segments of which form a small angle, ranging from 10° to 20°, with the direction of the circumference.

d. The intermediate ridges and the center ridge are continuous in the direction of the circumference.

The features set forth above confer many advantages.

1. The center zone of the crown, which may exert a ground pressure in the road-contact area that is insufficient to prevent creeping, comprises a wide circumferential ridge in order better to resist abrasion. In order to avoid the heating caused by a wide ridge, the ridge is divided into separate bands by one or more fine cutouts that do not, however, prevent mutual contact of the bands in the area of contact with the road. Moreover, in order to promote draining, this wide center ridge is bordered by relatively wide grooves.
2. Inasmuch as the lateral zones of the crown apply themselves to the ground with a comparatively high pressure, the circumferential lateral grooves are placed over the median lines of such lateral zones in order to improve the grip and water draining. On the other hand, at the junction of the lateral zones and the center zone of the crown, a ridge is provided to strengthen the tread along the lines of discontinuity of the reinforcement.

The lateral ridges adjacent to the shoulder are preferably cut transversely in order to promote draining of the area of contact and also to prevent heating up of the shoulder zone, in which the tread has its maximum thickness.

It goes without saying that the tread described is equally favorable for new tires and for the retreading of tires with the architecture indicated. Use on a tire having another construction cannot be recommended if one wishes to attain the results indicated, namely, uniform wear and tear and satisfactory draining at high speed.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
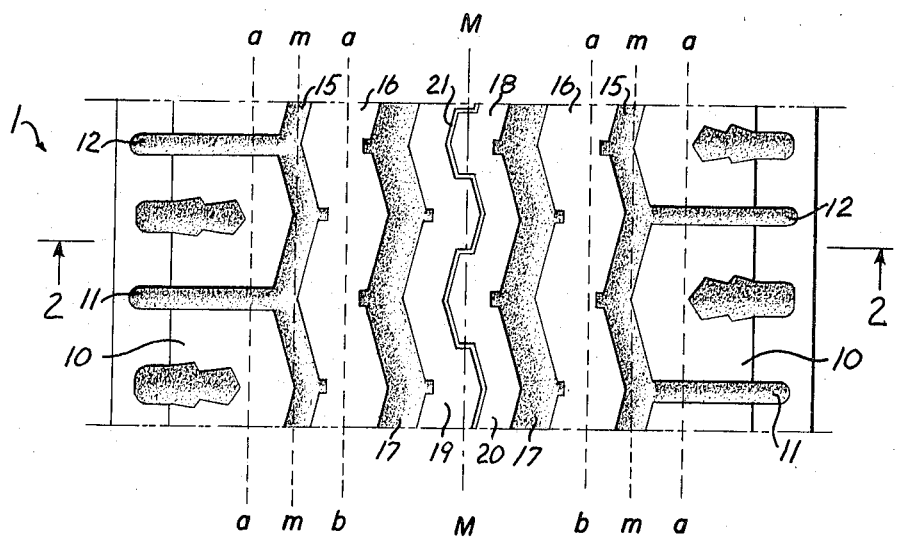
FIG. 1 is a plan view of a sector of approximately 12° of a tire having a tread in accordance with the invention.
Figure 2:
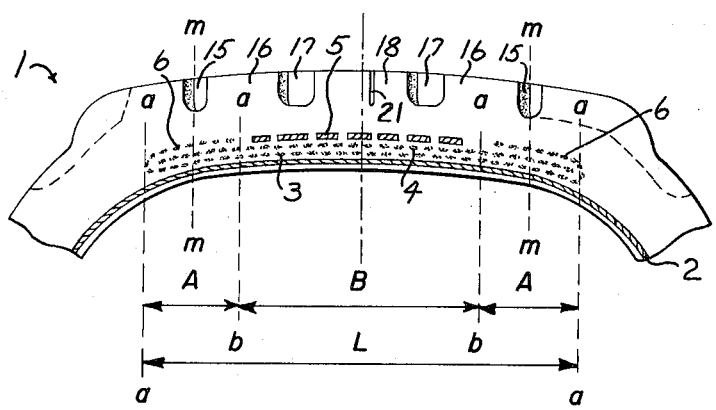
FIG. 2 is a view in radial section through the line 2—2 of FIG. 1, looking in the direction of the arrows and showing the same tread and also the crown reinforcement underneath.

FIGS. 1 and 2 show the tread 1 of an 11–24.5 tire for heavy loads, designed for high speeds.

As FIG. 2 shows, the reinforcement of the tread comprises, in addition to the carcass 2 constituted by steel cords arranged in radial planes, three steel cord plies 3, 4 and 5. The ply 3 is extended by the portions 6 that are folded back over the ply 4 in such a manner as to reach the ends of the ply 5. The width of each folded-back portion 6 is close to two-ninths of the width of the base portion of the ply 3. The cords of the ply 3 are inclined at an angle of 15° towards the right in the base portion and at an angle of 15° towards the left in the folded-back portions. The cords of the ply 4 are inclined at an angle of 22° towards the left and the cords of the ply 5 at an angle of 51° towards the left. All angles are defined in relation to the circumferential direction and as seen from a position above the tire.

From this description it becomes clear that the crown reinforcement comprises two lateral zones A each extending over about two-ninths of the width L of the crown reinfocement and a central zone B extending over about five-ninths of the width L of the crown reinforcement. Because of the different inclinations of the cords of the folded-back portions 6 of the ply 3 on the one hand and the cords of the ply 5 on the other, the zones A are more rigid than the zone B.

The figures show in broken or dotted lines
- the lines $a—a$ corresponding to the edges of the crown reinforcement,
- the lines $a–b$ corresponding to the junctions of the zones A and B,
- the lines $m—m$ which are the median lines of the zones A, and
- the line $M—M$ which is the median line of the zone B and of the tire.

As FIG. 1 shows, the tread comprises
- two circumferential ridges 10 which are discontinuous in the direction of the circumference, being cut through by transverse grooves 11 and 12;
- two circumferential grooves 15 into which open the transverse grooves 11 and 12. These grooves are centered on the lines $m—m$;
- two intermediate ridges 16 centered approximately on the lines $a–b$ and continuous in the direction of the circumference;
- two circumferential grooves 17; and
- one center ridge 18 divided into two bands 19 and 20 by a fine cutout 21 centered on the line M—M.

The center ridge 18 is substantially wider than the intermediate ridges 16. Its width is about 35 mm as against 25 mm for the ridges 16 (measured crosswise). Likewise, the grooves 17 are definitely wider than the grooves 15. Their widths are 11 mm as against 8 mm (measured perpendicular to the grooves). The inclination of the grooves and ridges with respect to the longitudinal direction is about 15°.

Experience has shown that the tire in accordance with the invention wears evenly, without any clear predominance of one region of the tread in relation to another, and that its properties of gripping both dry and wet ground are quite good.

It is within the scope of the invention to offset the intermediate ridges and the lateral grooves in relation to the position illustrated in the drawings and described above, as long as no substantial portion of the center and lateral grooves overlaps a junction line between zones of different rigidity of the crown reinforcement.

Many other embodiments of the invention will readily occur to those skilled in the art upon consideration of this disclosure. Accordingly, the invention is to be construed as including all the embodiments thereof within the scope of the appended claims.

I claim:

1. A tire comprising a radial carcass and a crown, the crown comprising a tread and a reinforcement, the reinforcement extending substantially over the entire width of the tread, and the crown being formed with two lateral portions and a center portion, the lateral portions being narrower and more rigid than the center portion, and the tread comprising, starting at the edges and proceeding towards the center: (a) two circumferential lateral ridges cut over their entire width by transverse grooves, (b) two circumferential lateral grooves substantially centered on the median lines of the comparatively rigid lateral portions of the crown, (c) two circumferential intermediate ridges substantially centered on the lines of junction of the comparatively rigid lateral portions and the less rigid center portion of the crown, (d) two circumferential center grooves, and (e) one circumferential center ridge at least as wide as the intermediate ridges.

2. A tire according to claim 1 comprising at least one fine circumferential cutout dividing the center ridge into at least two bands, the bands being of equal width.

3. A tire according to clam 1 wherein the center grooves are at least as wide as the lateral grooves.

4. A tire according to claim 3 wherein the ratio of the widths of the center and lateral grooves is substantially equal to the ratio of the widths of the center and intermediate ridges.

5. A tire according to claim 1 wherein the circumferential ridges and grooves have a zigzag pattern the successive segments of which form an angle within the range of 10° to 20° with respect to the circumferential direction.

6. A tire according to claim 1 wherein the center and intermediate ridges are circumferentially continuous.

* * * * *

PO-1050
(5/69)

UNITED STATES PATENT OFFICE
CERTIFICATE OF CORRECTION

Patent No. 3,799,230        Dated March 26, 1974

Inventor(s) Jean Bernard Montagne

It is certified that error appears in the above-identified patent and that said Letters Patent are hereby corrected as shown below:

On the Cover Page, after Assignee [73], "Etablissments" should be --Etablissements--; and "(Pug-de-Dame)" should be --(Puy-de-Dome)--; Col. 3, line 19, "reinfocement" should be --reinforcement--.

Signed and sealed this 3rd day of September 1974.

(SEAL)
Attest:

McCOY M. GIBSON, JR.
Attesting Officer

C. MARSHALL DANN
Commissioner of Patents